United States Patent
Yamamoto

(10) Patent No.: US 9,859,821 B2
(45) Date of Patent: Jan. 2, 2018

(54) MOTOR CONTROL APPARATUS HAVING A FUNCTION OF DETERMINING START OF MACHINE PROTECTING OPERATION

(71) Applicant: FANUC CORPORATION, Yamanashi (JP)

(72) Inventor: Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/851,559

(22) Filed: Sep. 11, 2015

(65) Prior Publication Data

US 2016/0087558 A1 Mar. 24, 2016

(30) Foreign Application Priority Data

Sep. 19, 2014 (JP) .................................. 2014-191846

(51) Int. Cl.
  *G05B 9/02* (2006.01)
  *H02P 3/18* (2006.01)
  (Continued)

(52) U.S. Cl.
  CPC .................. *H02P 3/18* (2013.01); *G05B 9/02* (2013.01); *H02P 5/74* (2013.01); *H02P 29/025* (2013.01); *H02P 1/029* (2013.01)

(58) Field of Classification Search
  USPC .................. 318/563, 400.21, 400.22, 782
  See application file for complete search history.

(56) References Cited

U.S. PATENT DOCUMENTS 5,070,290 A * 12/1991 Iwasa ...................... H02P 23/06
                                                     187/288
6,264,005 B1 * 7/2001 Kang ...................... B66B 5/027
                                                     187/290

(Continued)

FOREIGN PATENT DOCUMENTS

JP     51116920 A    10/1976
JP      6113483 A     4/1994
              (Continued)

OTHER PUBLICATIONS

English Abstract and Machine Translation for Japanese Publication No. 2006014546 A, published Jan. 12, 2006, 15 pgs.

(Continued)

*Primary Examiner* — Jorge L Carrasquillo
(74) *Attorney, Agent, or Firm* — Fredrikson & Byron, P.A.

(57) ABSTRACT

A motor control apparatus includes: a rectifier converting AC power into DC power; a smoothing capacitor provided for a DC link; an inverter connected to the DC link and mutually converts power between DC power and AC power; an AC voltage detector detecting voltage of a power supply; a voltage amplitude calculator converting the AC voltage value into a power supply voltage amplitude value; a power failure detector detecting a state of power failure when the power supply voltage amplitude value has continued to be equal to or lower than a first threshold for a predetermined period; a DC voltage detector detecting the DC voltage of the smoothing capacitor; and, a protecting operation start determining unit notifying the inverter of the actuation of axis stoppage or axis retraction when a power failure is detected and when the DC voltage value is equal to or lower than a second threshold.

2 Claims, 9 Drawing Sheets

(51) Int. Cl.
*H02P 29/024* (2016.01)
*H02P 5/74* (2006.01)
*H02P 1/02* (2006.01)

(56) References Cited

U.S. PATENT DOCUMENTS

| | | | | |
|---|---|---|---|---|
| 7,122,992 | B2* | 10/2006 | Lee | H02P 1/021 318/801 |
| 9,401,669 | B2* | 7/2016 | Tsutsumi | H02P 29/025 |
| 2011/0175557 | A1* | 7/2011 | Iwashita | H02P 23/06 318/400.3 |
| 2013/0134910 | A1* | 5/2013 | Iwashita | H02P 3/14 318/376 |
| 2014/0306634 | A1* | 10/2014 | Sakai | H02P 27/085 318/490 |
| 2014/0306640 | A1* | 10/2014 | Yamamoto | H02P 27/08 318/504 |

FOREIGN PATENT DOCUMENTS

| | | | |
|---|---|---|---|
| JP | H09266695 A | | 10/1997 |
| JP | 2001333545 A | * | 11/2001 |
| JP | 2005192353 A | | 7/2005 |
| JP | 2006014546 A | | 1/2006 |
| JP | 2013115994 A | | 6/2013 |
| JP | 2013219875 A | | 10/2013 |
| JP | 2014096929 A | | 5/2014 |

OTHER PUBLICATIONS

English Translation of Japanese Publication No. 2014096929, published May 22, 2014, 37 pages.
English Translation of Abstract for Japanese Publication No. 2013219875, published Oct. 24, 2013, 1 page.
English Translation of Japanese Publication No. H09266695, published Oct. 7, 1997, 12 pages.
English Abstract and Machine Translation for Japanese Publication No. 2005-192353 A, published Jul. 14, 2005, 17 pgs.
English Abstract and Machine Translation for Japanese Publication No. 2013-115994 A, published Jun. 10, 2013, 26 pgs.
English Abstract and Machine Translation for Japanese Publication No. 2001-333545 A published Nov. 30, 2001, 16 pgs.
English Abstract and Machine Translation for Japanese Publication No. 06-113483 A published Apr. 22, 1994, 6 pgs.
English Abstract and Machine Translation for Japanese Publication No. 51-116920 A published Oct. 14, 1976, 5 pgs.

* cited by examiner

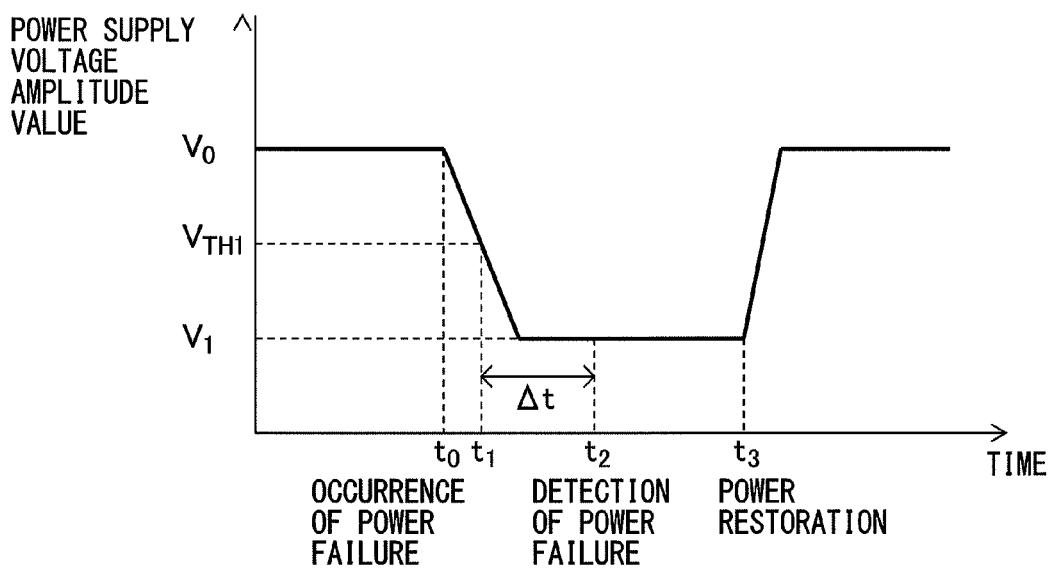
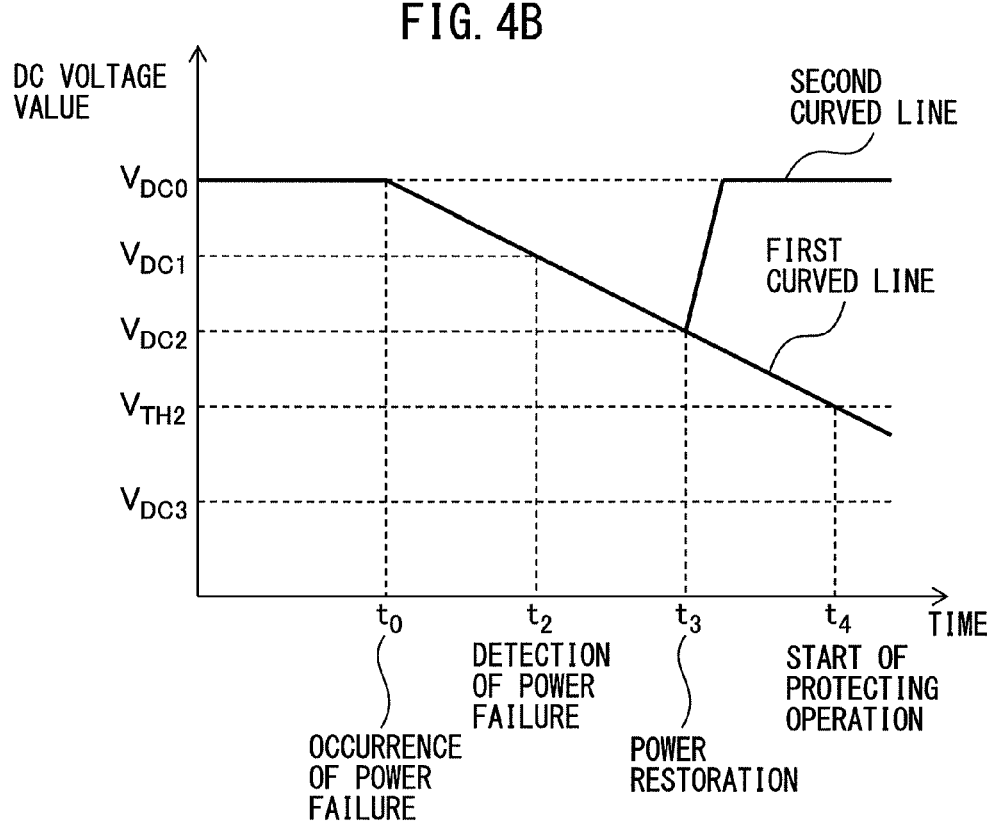

MOTOR CONTROL APPARATUS HAVING A FUNCTION OF DETERMINING START OF MACHINE PROTECTING OPERATION

BACKGROUND OF THE INVENTION

1. Field of the Invention

The present invention relates to a motor control apparatus, in particular to a motor control apparatus having a function of determining whether or not a machine protecting operation should be started.

2. Description of the Related Art

Motor control apparatuses for driving motors in a machine tool, forging press machine, injection molding machine, robot or the like use a rectifier for converting AC power from a three-phase AC input power supply into DC power and an inverter for converting DC power output from the rectifier into AC power for motor drive.

In a motor control apparatus of the above kind, if a power failure occurs on the AC power supply side of the rectifier and resultantly the input power voltage lowers, normal motor operation cannot continue, causing some faults in the process using the motor control apparatus. In order to deal with this, the motor control apparatus needs to have a power failure detecting device on the AC power supply side so as to be able to perform a protecting operation for avoiding or minimizing the faults when a power failure is detected.

To detect a power failure, for example there is a known method of detecting a power failure by transforming the components of the three-phase AC input power supply into a voltage vector on the 2-phase coordinate system, calculating the amplitude of the vector to determine the amplitude of the power supply voltage, and determining the occurrence of a power failure when the calculated value has continued to be lower than a reference voltage level for a predetermined reference period of time (e.g., Japanese Patent Application Laid-open No. 2006-14546(JP 2006-14546 A)).

However, if the voltage of the DC link, i.e., the DC output side of the rectifier, is kept as is even at the time of a power failure, the motor can continue normal drive. At most of momentary power failures (momentary voltage drops) the voltage of the DC link will not drop thanks to the effect of the accumulated electricity in the smoothing capacitor of the rectifier. Nevertheless, in the prior art technology, once a momentary power failure occurs, the system detects the power failure and takes a protecting action such as axis stoppage and axis retraction even if the motor can continue running. This leads to a drop of working efficiency of the machine.

A power failure detecting method based on the amplitude value of the power supply voltage in a conventional motor control apparatus will be described. FIG. 1 is a configurational diagram of a conventional electric control apparatus. In a conventional motor control apparatus 1000, AC power is supplied from three-phase AC power supply 10 to a rectifier 110 via an AC reactor 190, and the rectifier 110 converts AC power into DC power. The DC power output from the rectifier 110 is smoothed by a smoothing capacitor 120 provided in a DC link 200 and then supplied to an inverter 130. The inverter 130 converts the DC power into AC power to drive a motor 30.

As shown in FIG. 1, an AC voltage detector 140 detects the voltage of the three-phase AC power supply 10, and a voltage amplitude calculator 150 calculates the amplitude value. A power failure detector 160 determines that a power failure is occurring in the three-phase AC power supply 10 when the amplitude value has been continuously lower than a reference voltage level for a predetermined period of time.

A power failure occurring in the three-phase AC power supply 10 does not directly mean an instant cessation of normal operation of the motor 30. The motor 30 can continue normal operation as long as the energy supplied to the inverter 130 (=the energy at the DC link on the DC output side of the rectifier 110) is retained.

It is true that if an event of a momentary power failure coincides with an event of acceleration or deceleration in the motor, in other words, an event at which the motor's output is maximized, there is a risk that the DC voltage will drop. However, occurrence of such a situation is extremely rare. Accordingly, in most momentary power failures, due to the effect of the accumulated electricity in the smoothing capacitor of the rectifier, the motor can continue normal operation without being affected by a sharp drop of the DC link voltage.

However, in the conventional power failure detecting method based on the amplitude value of the power supply voltage, detection of whether or not the power supply is in a state of power failure is performed regardless of the state of the DC link. As a result, a momentary power outage for which no protecting action is needed is also detected as a power failure so that the machine implements a protecting operation.

If the machine performs a protecting operation, the machine processing stops though no work and tools will be damaged. Therefore, if a machine protecting operation is performed every time a momentary power outage takes place, there is a problem that work efficiency of the machine degrades.

SUMMARY OF THE INVENTION

Conventionally there has been a work efficiency degradation problem because a protecting operation is actuated by the detection of a power failure even if the power failure is a momentary power outage, which in most cases will not cause any voltage drop in the DC link.

A motor control apparatus according to one embodiment of the present invention includes: a rectifier that converts AC power supplied from a three-phase AC power supply into DC power; a smoothing capacitor provided for a DC link on the DC output side of the rectifier; an inverter that is connected to the DC link and mutually converts power between DC power at the DC link, and the drive power of a motor for driving a axis or AC power as the regenerative power from the motor; an AC voltage detector that detects the AC voltage value of the three-phase AC power supply; a voltage amplitude calculator that converts the AC voltage value into a power supply voltage amplitude value; a power failure detector that detects a state of power failure of the three-phase AC power supply when the power supply voltage amplitude value has continued to be equal to or lower than a first threshold for a predetermined period of time; a DC voltage detector for detecting the DC voltage value of the smoothing capacitor; and, a protecting operation start determining unit that notifies the inverter of the actuation of axis stoppage or axis retraction when the power failure detector has detected a power failure of the three-phase AC power supply and when the DC voltage value is equal to or lower than a second threshold.

BRIEF DESCRIPTION OF THE DRAWINGS

The object, features and advantages of the present invention will be better understood by reading the following description of the embodiments, taken together with the drawings wherein:

FIG. 4A is a graph for explaining the relationship between the amplitude of power supply voltage of a three-phase AC power supply and the timings of a power failure detection and start of a protecting operation when the three-phase AC power supply is restored in a motor control apparatus according to an embodiment 1 of the present invention;

FIG. 4B is a graph for explaining the relationship between the DC voltage value of a DC link and the timings of a power failure detection and start of a protecting operation when the three-phase AC power supply is restored in a motor control apparatus according to an embodiment 1 of the present invention;

DESCRIPTION OF THE INVENTION

Figure 1:
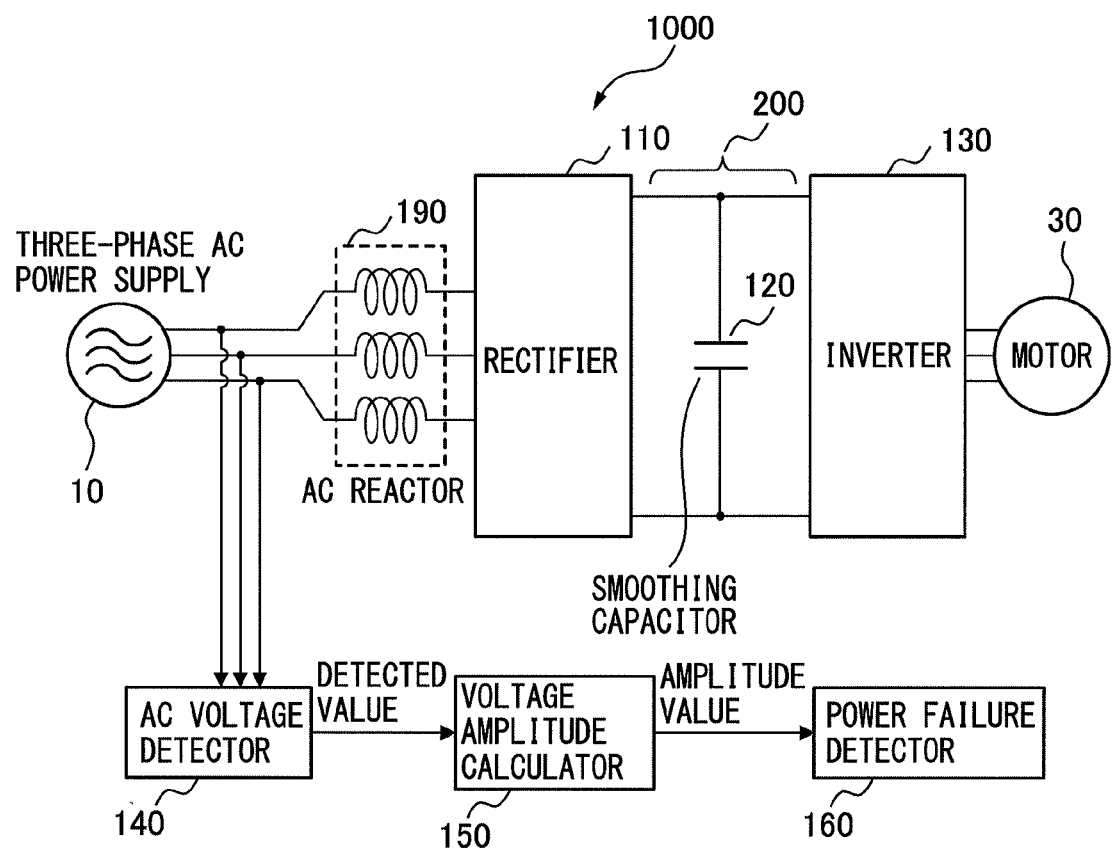
FIG. 1 is a configurational diagram of a conventional motor control apparatus.

Referring to the drawings, a motor control apparatus according to the present invention will be described. However, it should be noted that the technical scope of the present invention is not limited by the embodied mode of these but embraces the inventions defined by the claims and their equivalence.

Embodiment 1

Figure 2:
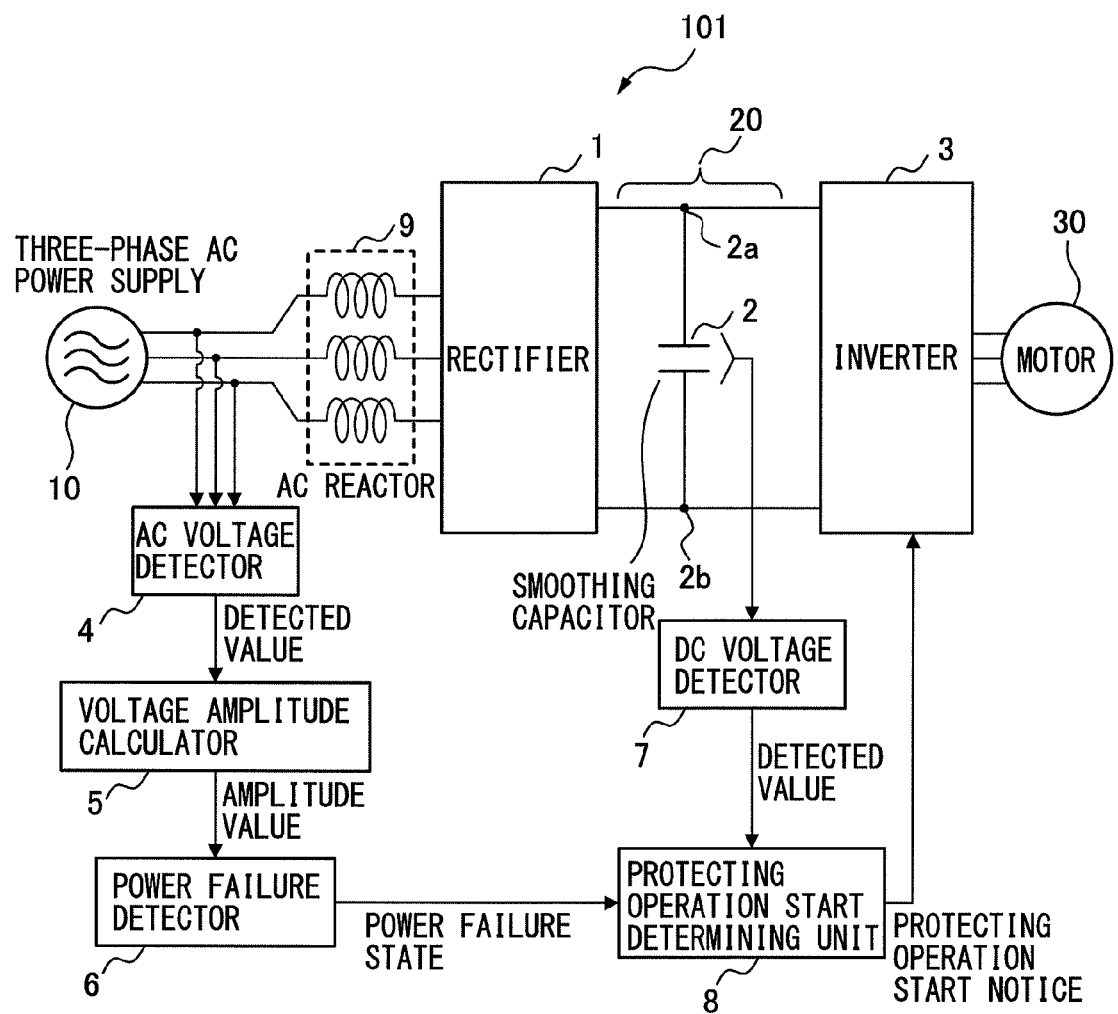
FIG. 2 is a configurational diagram of a motor control apparatus according to an embodiment 1 of the present invention.

A motor control apparatus according to an embodiment 1 of the present invention will be described with reference to the drawings. FIG. 2 is a configurational diagram of a motor control apparatus according to the embodiment 1 of the present invention. A motor control apparatus 101 according to the embodiment 1 of the present invention includes: a rectifier 1 that converts AC power supplied from a three-phase AC power supply 10 into DC power; a smoothing capacitor 2 provided for a DC link 20 on the DC output side of the rectifier 1; an inverter 3 that is connected to the DC link 20 and mutually converts power between DC power at the DC link 20, and the drive power of the motor 30 for driving a axis or AC power, i.e., the regenerative power from the motor 30; an AC voltage detector 4 that detects the AC voltage value of the three-phase AC power supply 10; a voltage amplitude calculator 5 that converts the AC voltage value into a power supply voltage amplitude value; a power failure detector 6 that detects a state of power failure of the three-phase AC power supply 10 when the power supply voltage amplitude value has continued to be equal to or lower than a first threshold for a predetermined period of time; a DC voltage detector 7 for detecting the DC voltage value across the smoothing capacitor 2; and a protecting operation start determining unit 8 that notifies the inverter 3 of start of axis stoppage or axis retraction when the power failure detector 6 has detected a power failure of the three-phase AC power supply 10 and when the DC voltage is equal to or lower than a second threshold.

The AC voltage detector 4 detects the value of voltage on the AC input side of the rectifier 1. Specifically, the AC voltage detector 4 is connected to the cables that connect three-phase AC power supply 10 and the rectifier 1 via AC reactor 9 to detect the value of AC voltage of the three-phase AC power supply 10.

The voltage amplitude calculator 5 converts the detected value of the AC voltage detector 4, i.e., the AC voltage value of the three-phase AC power supply 10, into a power supply voltage amplitude value. This conversion may be done by converting the detected value by phase conversion from three phase to two phase and calculating the norm of the obtained vector, or may be performed by determining the peak value of the detected value.

The power failure detector 6 determines that the three-phase AC power supply 10 is in a power failure state when the power supply voltage amplitude value calculated by the voltage amplitude calculator 5 has continued to be equal to or lower than the first threshold for a predetermined period of time. Accordingly, the three-phase AC power supply 10 will not be determined to be in a state of power failure when the power supply voltage amplitude value takes a value equal to or lower than the first threshold in a very short period. As a result, it is possible to avoid a case where the power supply voltage amplitude value is lowered due to noise or the like, as a power failure.

The DC voltage detector 7 detects the voltage across the DC link 20 (smoothing capacitor 2) on the DC output side of the rectifier 1 and outputs the detected DC voltage detected value. Specifically, the DC voltage detector 7 measures the voltage between terminals 2a and 2b on the both sides of the smoothing capacitor 2.

The protecting operation start determining unit 8 notifies the inverter 3 of the start of a protecting operation for the machine (not shown) being driven by the motor 30 when the power failure detector 6 determines that the three-phase AC power supply 10 is in a power failure state and when the detected DC voltage value detected by the DC voltage detector 7 takes a value equal to or lower than the second threshold. Herein, the second threshold is set at a value greater than the sum of the DC voltage value of the DC link under which the motor 30 cannot continue to run normally and the energy required from detection of a power failure to the start of a machine protecting operation, as a margin.

FIG. 2 shows a case where only a motor is connected. However, the number of connected motors is not limited to this. Two or more motors can be connected.

Figure 3A:
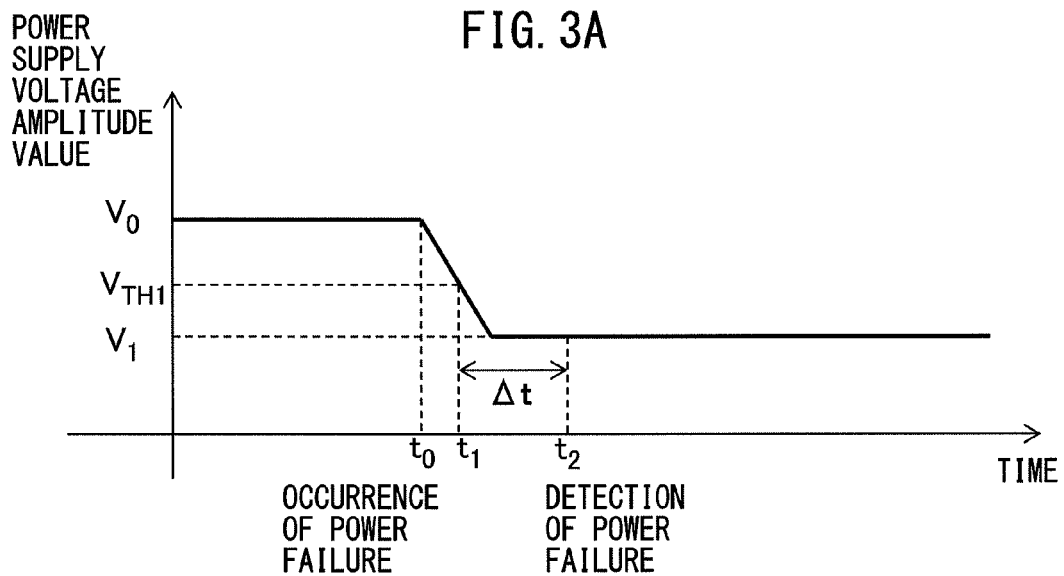
FIG. 3A is a graph for explaining the relationship between the amplitude value of power supply voltage of a three-phase AC power supply and the timings of a power failure detection and start of a protecting operation when the three-phase AC power supply will not be restored in a motor control apparatus according to an embodiment 1 of the present invention.
Figure 3B:
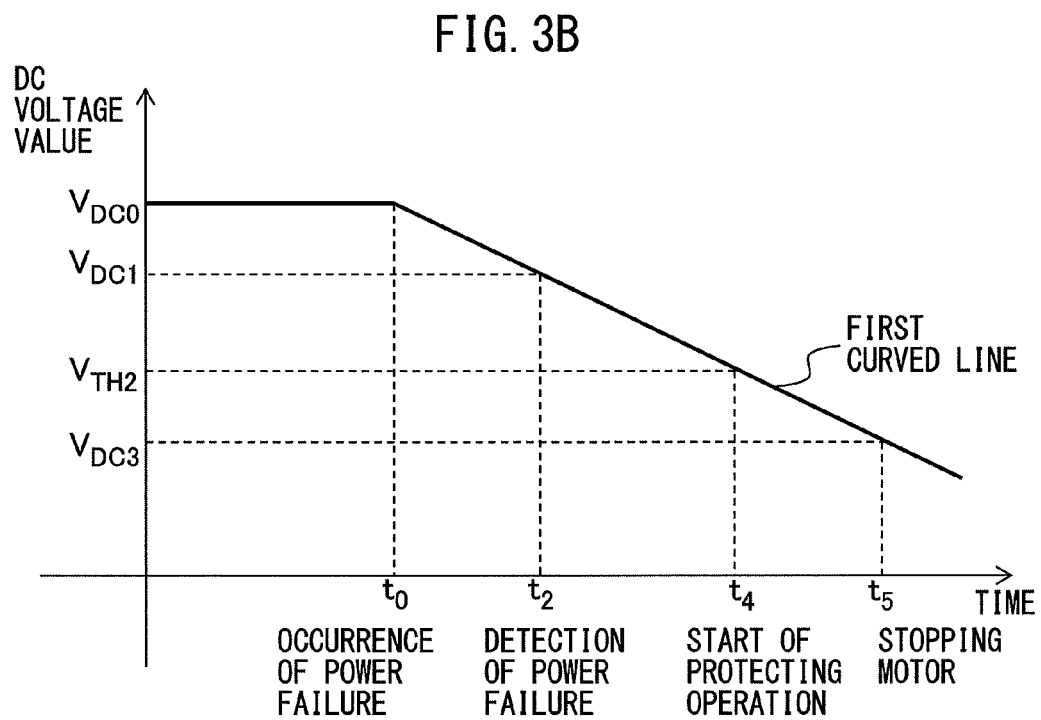
FIG. 3B is a graph for explaining the relationship between the DC voltage value of a DC link and the timings of a power failure detection and start of a protecting operation when the three-phase AC power supply will not be restored in a motor control apparatus according to an embodiment 1 of the present invention.

Next, the operation of the motor control apparatus according to the embodiment 1 of the present invention from the occurrence of a power failure to the start of a projecting operation will be described in detail. First, a description will be made with regard to the operation of the motor control apparatus when the three-phase AC power supply will not be restored. FIG. 3A is a graph showing time-dependent change of the power supply voltage amplitude value of the three-phase AC power supply 10 when the three-phase AC power supply will not be restored. FIG. 3B is a graph showing time-dependent change of the DC voltage value of the DC link 20 when the three-phase AC power supply will not be restored. In FIGS. 3A and 3B an example in which the power supply voltage amplitude value and the DC voltage value decrease in proportion to time. However, this is a mere example, and the present invention should not be limited to this.

As shown in FIG. 3A, $V_0$ is the power supply voltage amplitude value of the three-phase AC power supply 10 before time $t_0$, i.e., the occurrence of a power failure. FIG. 3A is a diagram on the assumption that the three-phase AC power supply 10 is down at time $t_0$, then the power supply voltage amplitude value gradually lowers and finally decreases to a certain specific voltage $V_1$. In a general power failure, $V_1$ is equal to 0[V]. In this case, a predetermined voltage value between power supply voltage amplitude values $V_0$ and $V_1$ is set at the first threshold $V_{TH1}$. The time at which the power supply voltage amplitude value reaches the first threshold $V_{TH1}$ is $t_1$. The three-phase AC power supply 10 is determined to be down at a point of time a predetermined period of time $\Delta t$ after $t_1$. Herein, when $t_2$ is the time at which power failure is detected, the time interval from $t_1$ to $t_2$ corresponds to the predetermined period of time $\Delta t$. In this way, in order to determine whether or not the three-phase AC power supply 10 is in a state of power failure, the period during which the power supply voltage amplitude value takes a value not greater than the first threshold $V_{TH1}$ is set at the predetermined period of time for determining the presence or absence of a power failure. With this setting, it is possible to avoid erroneous detection of a power failure in the three-phase AC power supply 10 when the power supply voltage amplitude value temporarily falls equal to or lower than the first threshold $V_{TH1}$ due to noise or the like.

Next, description will be made on time-dependent change of the DC voltage value. As shown in FIG. 3B, it is assume that the DC voltage value of the DC link 20 before time $t_0$ before the occurrence of a power failure in the three-phase AC power supply 10 is $V_{DC0}$. When the three-phase AC power supply 10 is down at time $t_0$, the DC voltage value of the DC link 20 lowers. It is also assumed that the DC voltage value lowers like a first curved line in FIG. 3B. First, the DC voltage value lowers to $V_{DC1}$ at time $t_2$ at which a power failure is detected, then the DC voltage value of the DC link 20 reaches the second threshold $V_{TH2}$ at time $t_4$, at which a motor protecting operation is started.

It is also assumed that at time $t_5$ the DC voltage reaches $V_{DC3}$, and the motor becomes unable to continue normal operation. It is understood that setting the second threshold $V_{TH2}$ at a value greater than $V_{DC3}$ makes it possible to start a motor protecting operation before the motor becomes unable to continue normal operation.

Next, description will be made on the operation of the motor control apparatus when the three-phase AC power supply is restored. FIG. 4A is a graph showing time-dependent change of the power supply voltage amplitude value of the three-phase AC power supply 10 when the three-phase AC power supply is restored. FIG. 4B is a graph showing time-dependent change of the DC voltage value of the DC link 20 when the three-phase AC power supply is restored. When, at time $t_3$ which is a point of time after time $t_2$ at which a power failure occurs and before time $t_4$ at which a protecting operation is started, the three-phase AC power supply is restored as indicated by a second curved line shown in FIG. 4B, it is possible to avoid a protecting operation starting after once a power failure has been detected. That is, when the minimum value $V_{DC2}$ of the DC voltage value is greater than the second threshold $V_{TH2}$ as indicated by the second curved line, the DC voltage value of the DC link 20 has been restored high enough to drive the motor. In this case, it is possible to avoid start of an unnecessary motor protecting operation.

Figure 5:
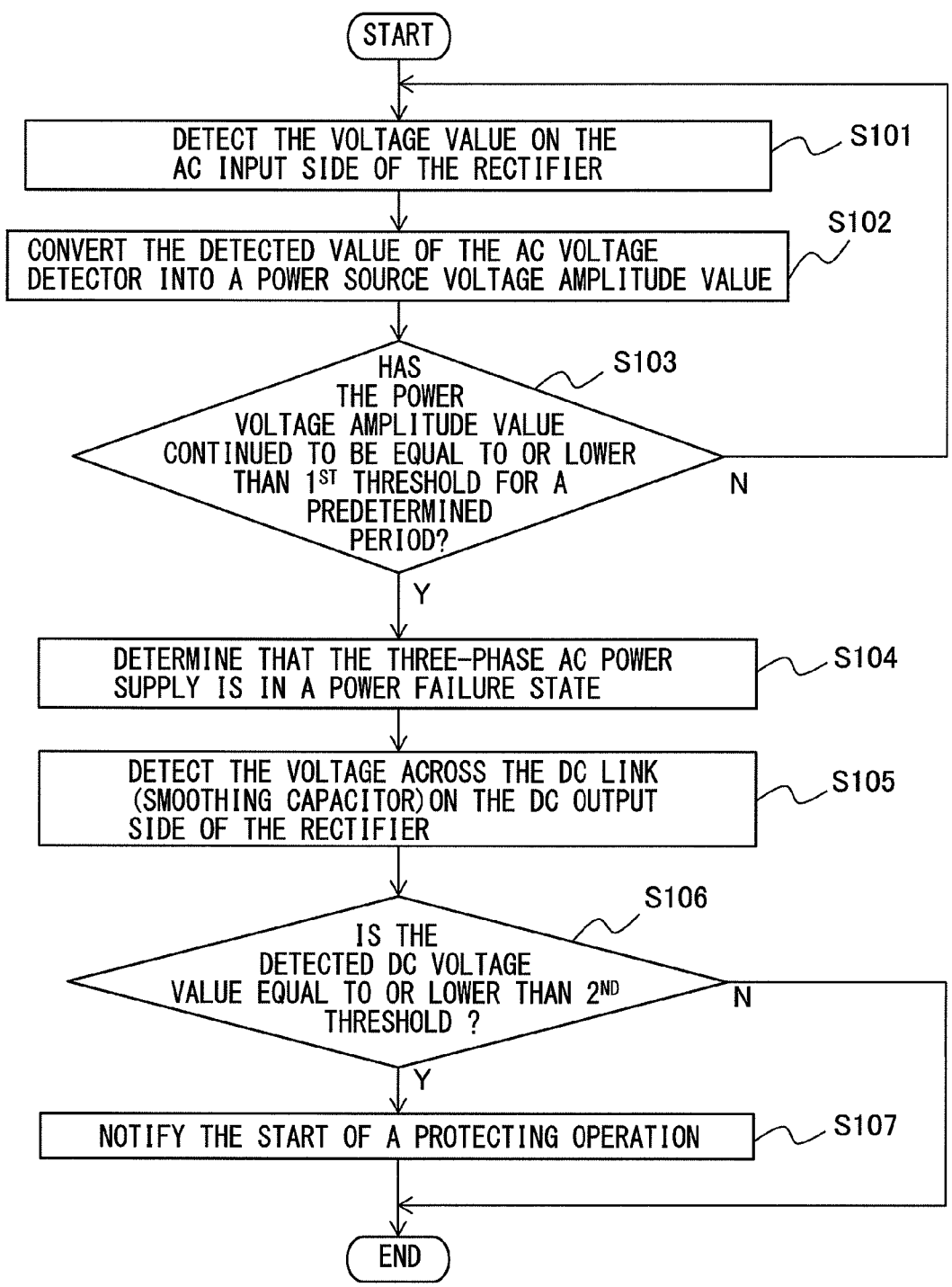
FIG. 5 is a flow chart for explaining the operation sequence of a motor control apparatus according to an embodiment 1 of the present invention.

Next, the operation sequence of the motor control apparatus according to the embodiment 1 of the present invention will be described using a flow chart shown in FIG. 5.

First, at Step S101 AC power is supplied from the three-phase AC power supply 10 to the rectifier 1, and the AC voltage detector 4 detects the value of voltage on the AC input side of the rectifier 1, as shown in FIG. 2. Next, at Step S102 the voltage amplitude calculator 5 converts the detected value of the AC voltage detector 4 into a power supply voltage amplitude value. This conversion may be done by converting the detected values by phase conversion from three phase to two phase and calculating the norm of the obtained vector, or may be performed by determining the peak value of the detected value.

Next, at Step S103 the power failure detector 6 determines whether or not the power supply voltage amplitude value calculated by the voltage amplitude calculator 5 has continued to be equal to or lower than the first threshold for a predetermined period of time. When it is determined that the power supply voltage amplitude value has not continued to be equal to or lower than the first threshold for the predetermined period of time, the control returns to Step S101 and detection of the voltage value of the three-phase AC power supply 10 is continued.

On the other hand, when the power supply voltage amplitude value has continued to be equal to or lower than the first threshold for the prescribed period of time, the three-phase AC power supply 10 is determined to be in a power failure state at Step S104.

Next, at Step S105 the DC voltage detector 7 detects the DC voltage value, or the voltage across the DC link 20 (smoothing capacitor 2) on the DC output side of the rectifier 1. Then, at Step S106 the protecting operation start determining unit 8 determines whether or not the detected DC voltage value is equal to or lower than the second threshold. When the detected DC voltage takes a value equal to or lower than the second threshold in default of recovery of the three-phase AC power supply 10, the protecting operation start determining unit 8 notifies the inverter 3 of the start of a protecting operation at Step S107.

On the other hand, when the detected DC voltage takes a value greater than the second threshold as a result of recovery of the three-phase AC power supply 10, the protecting operation start determining unit 8 will not give the inverter 3 a notice of start of a protecting operation. In this way, the protecting operation start determining unit 8 is adapted to give a notice of start of a protecting operation when the power failure detector determines the occurrence of a power failure and when the detected DC voltage takes a value equal to or lower than the second threshold.

As described above, according to the motor control apparatus of the embodiment 1 of the present invention, a notice of starting a protecting operation is given when the DC voltage across the DC link falls equal to or lower than a predetermined level. As a result, it is possible to perform a machine protecting operation only when the motor cannot continue normal operation due to a power failure, whereas no machine protecting operation will be performed at most cases of momentary power failures during which the motor can continue normal operation. As a result, it is possible to minimize the frequency of machine protecting operation, hence suppress degradation of work performance of the machine.

Embodiment 2

Figure 6:
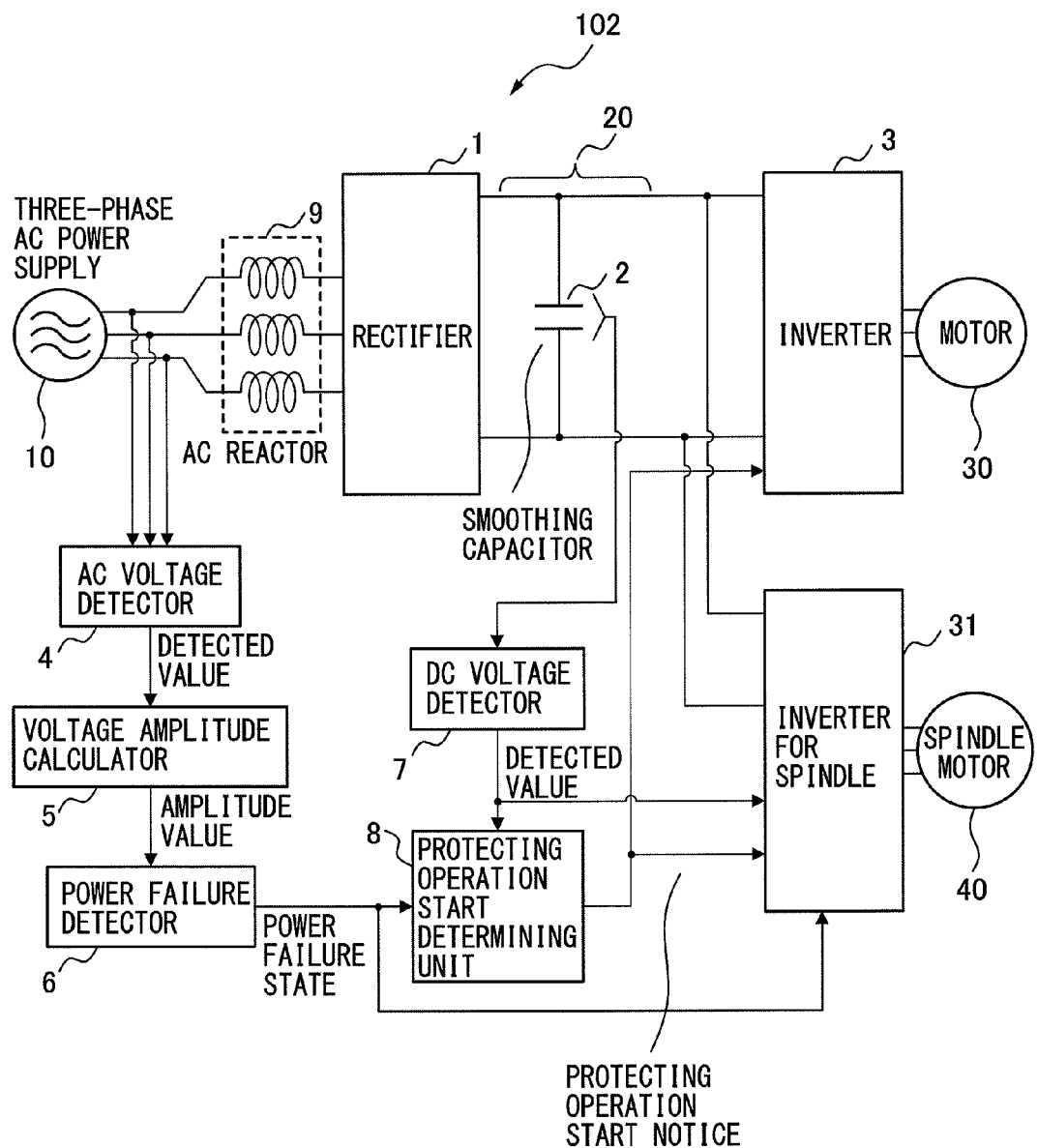
FIG. 6 is a configurational diagram of a motor control apparatus according to an embodiment 2 of the present invention.

Next, a motor control apparatus according to a second embodiment 2 of the present invention will be described. FIG. 6 is a configurational diagram of a motor control apparatus according to the second embodiment 2 of the present invention. The difference of a motor control apparatus 102 of the second embodiment 2 from the motor control apparatus 102 of the embodiment 1 resides in that a plurality of inverters 3 and 31 are connected to a DC link 20 on the DC output side of a rectifier 1, and at least one of the multiple inverters accelerates or decelerates a spindle motor 40 when a power failure detector 6 detects a power failure of a three-phase AC power supply 10, whereby the DC voltage is controlled to fall within a predetermined range above the second threshold. The other configurations of the motor control apparatus according to the embodiment 2 are the same as those of the motor control apparatus of the embodiment 1, so detailed description is omitted.

A typical machine includes a plurality of motors. Among these, the motor for the spindle can be relatively freely accelerated or decelerated without causing problems.

Based on this fact, among the multiple inverters 3 and 31, the inverter 31 for driving the spindle motor 40 accelerates or decelerates the spindle motor 40 while monitoring the DC voltage value of the DC link 20 to exchange energy when a notice of the three-phase AC power supply 10 being in a power failure state is given from the power failure detector 6, whereby the DC voltage of the DC link is controlled within a range in which the motor 30 can continue normal operation.

Acceleration of the spindle motor 40 consumes energy from the DC link 20, hence can lower the DC link voltage or the DC voltage value of the DC link. On the other hand, deceleration of the spindle motor 40 returns energy to the DC link 20, hence can increase the DC voltage value of the DC link.

In this way, mutual energy exchanges between the kinetic energy of the motor 30 and the energy in the DC link by acceleration and deceleration of the spindle motor 40 make it possible to control the DC voltage value of the DC link.

Use of the motor control apparatus according to the embodiment 2 of the invention increases the possibility of keeping up the DC link voltage at the occurrence of a power failure and reduces the risk of needing a machine protecting operation at momentary power failures.

In FIG. 6, only two motors are connected. However, the number of connected motors is not limited to this. Three or more motors can be connected. Further, two or more spindle motors may be provided.

Figure 7A:
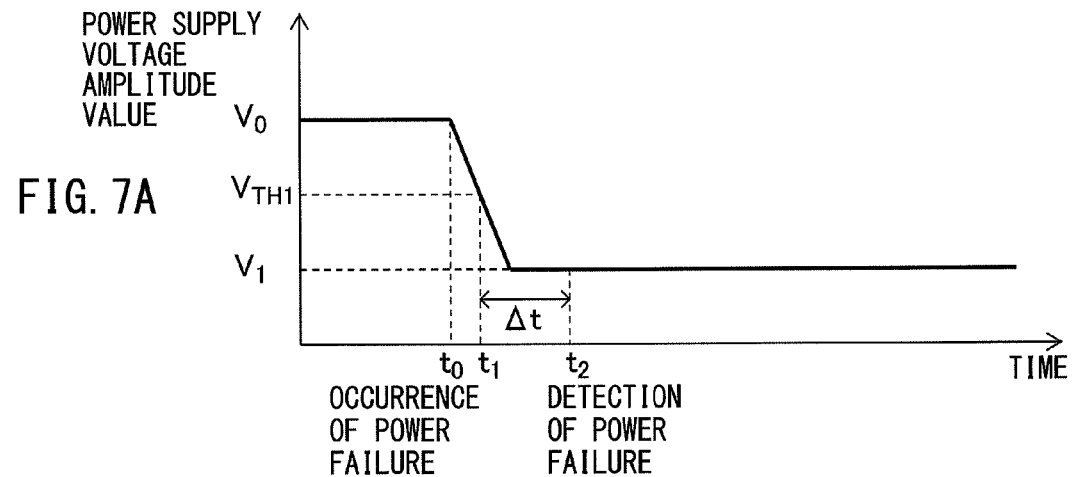
FIG. 7A is a graph for explaining the relationship between the amplitude value of power supply voltage of a three-phase AC power supply and the timings of a power failure detection and start of a protecting operation when a spindle motor is decelerated in a motor control apparatus according to an embodiment 2 of the present invention.
Figure 7B:
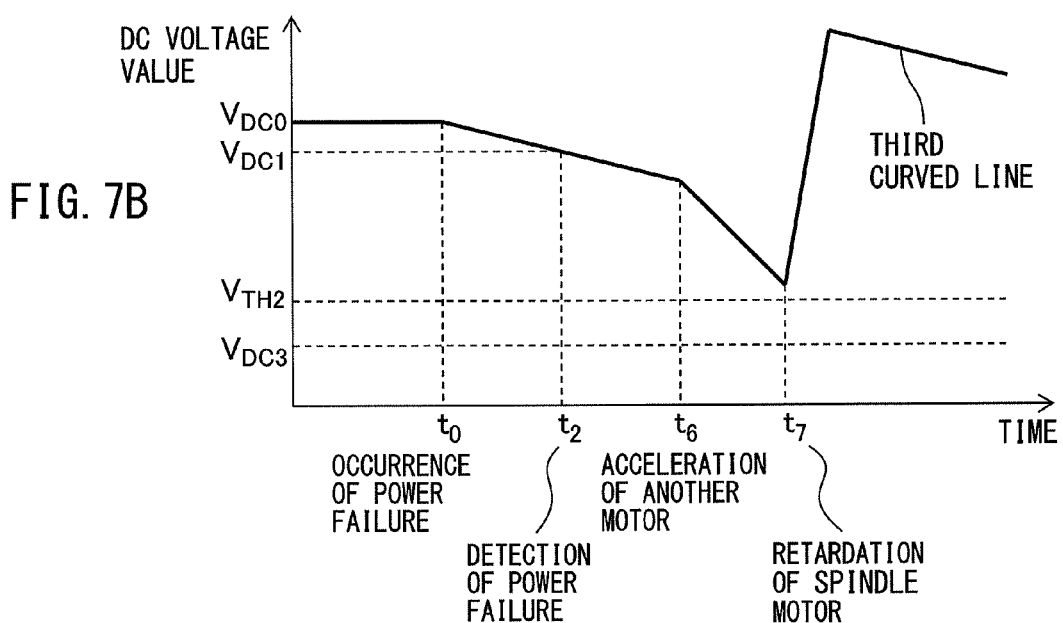
FIG. 7B is a graph for explaining the relationship between the DC voltage value of a DC link and the timings of a power failure detection and start of a protecting operation when a spindle motor is decelerated in a motor control apparatus according to an embodiment 2 of the present invention.
Figure 7C:
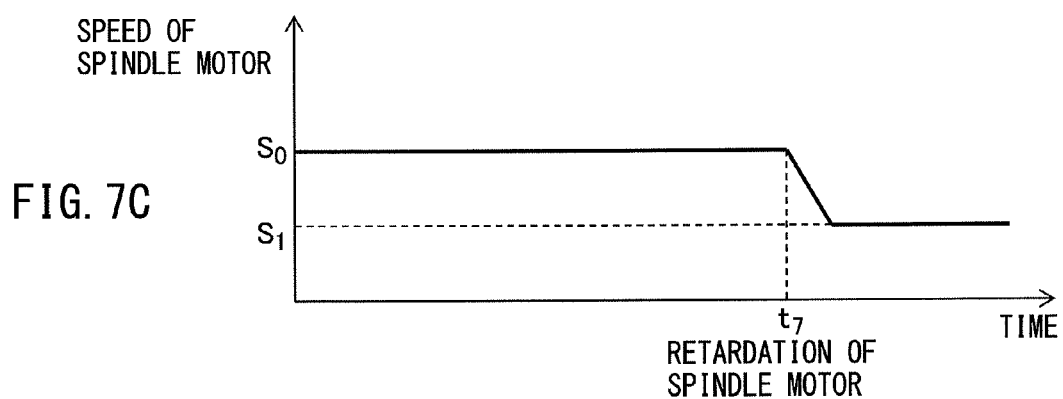
FIG. 7C is a graph for explaining the relationship between the speed of a spindle motor and the timings of a power failure detection and start of a protecting operation when the spindle motor is decelerated in a motor control apparatus according to an embodiment 2 of the present invention.

Next, the operation from the occurrence of a power failure to the start of a protecting operation in the motor control apparatus according to the embodiment 2 of the invention will be described. First, description will be made on the operation of the motor control apparatus when the spindle motor is decelerated. FIGS. 7A to 7C are graphs showing time-dependent changes of the power supply voltage amplitude value in the three-phase AC power supply 10, the DC voltage value of the DC link 20 and the speed of the spindle motor, respectively when the spindle motor is decelerated.

As shown in FIG. 7A, $V_0$ is the power supply voltage amplitude value of the three-phase AC power supply 10 before time $t_0$, i.e., the occurrence of a power failure. FIG. 7A is a diagram on the assumption that the three-phase AC power supply 10 is down at time $t_0$, then the power supply voltage amplitude value gradually lowers and finally decreases to a certain specific voltage $V_1$. In a general power failure, $V_1$ is equal to 0[V].

As shown by the solid line in FIG. 7B, the DC voltage value of the motor control apparatus according to the embodiment 2 behaves in the same manner as in the embodiment 1 until time $t_2$ at which a power failure is detected in the three-phase AC power supply 10. When a motor 30 other than the spindle motor 40 is accelerated in the interval from time $t_2$ to time $t_6$, the DC voltage value sharply lowers. In the motor control apparatus according to the embodiment 2, the spindle motor 40 is decelerated from a speed $S_0$ to $S_1$ at time $t_7$ (See FIG. 7C) before the DC voltage value falls to a second threshold $V_{TH2}$ as indicated by a third curved line. This makes the DC link 20 recover energy so that the DC voltage value of the DC link 20 increases. As a result, the DC voltage value of the DC link 20 will not fall equal to or lower than the second threshold $V_{TH2}$, hence it is possible to avoid actuation of a machine protecting operation.

Figure 8A:
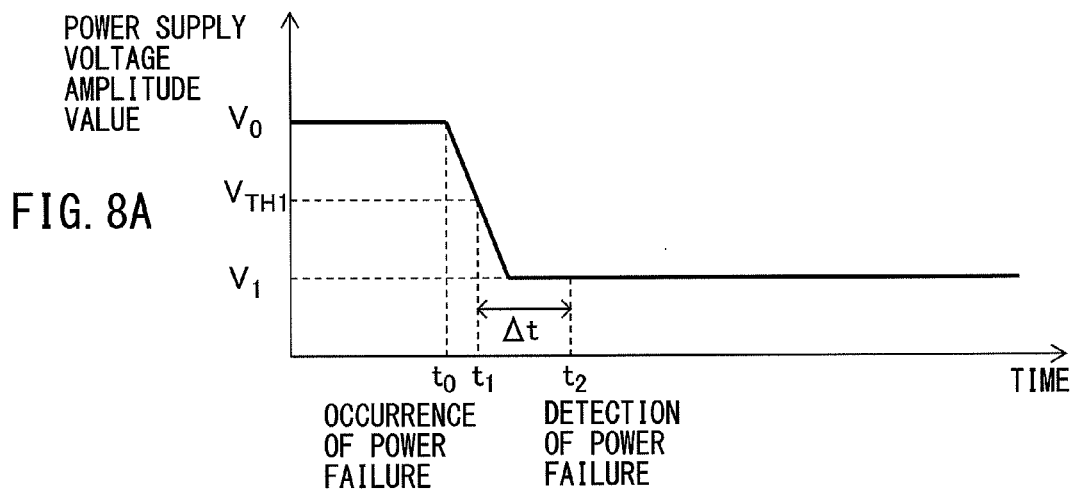
FIG. 8A is a graph for explaining the relationship between the amplitude value of power supply voltage of a three-phase AC power supply and the timings of a power failure detection and start of a protecting operation when a spindle motor is accelerated in a motor control apparatus according to an embodiment 2 of the present invention.
Figure 8B:
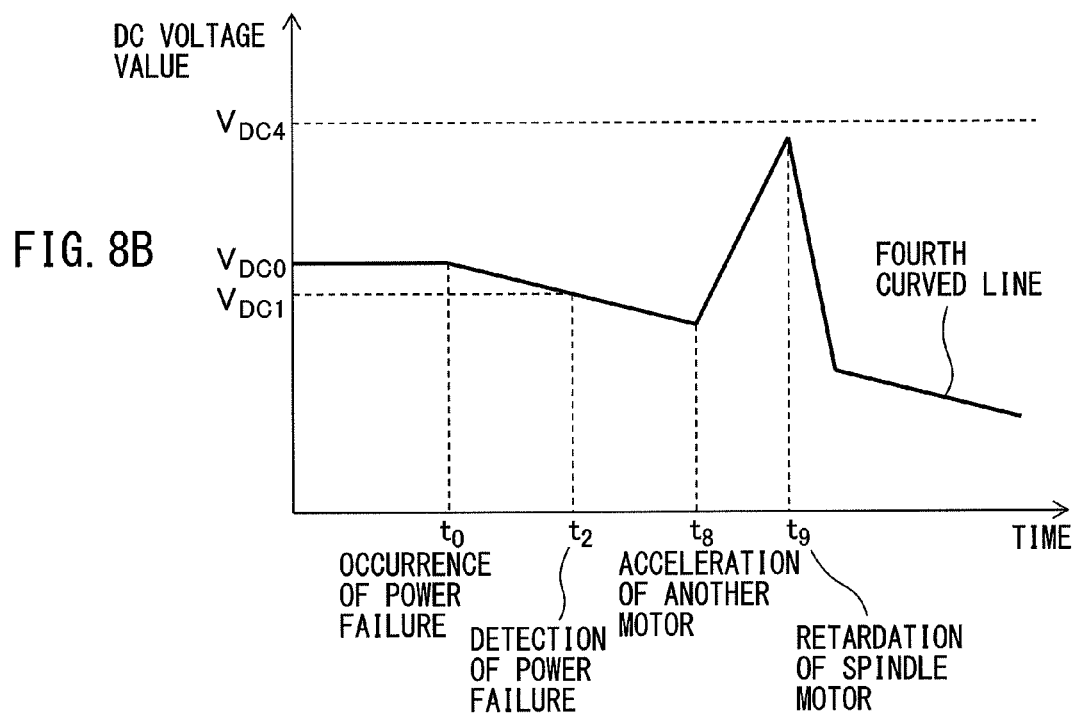
FIG. 8B is a graph for explaining the relationship between the DC voltage value of a DC link and the timings of a power failure detection and start of a protecting operation when a spindle motor is accelerated in a motor control apparatus according to an embodiment 2 of the present invention.
Figure 8C:
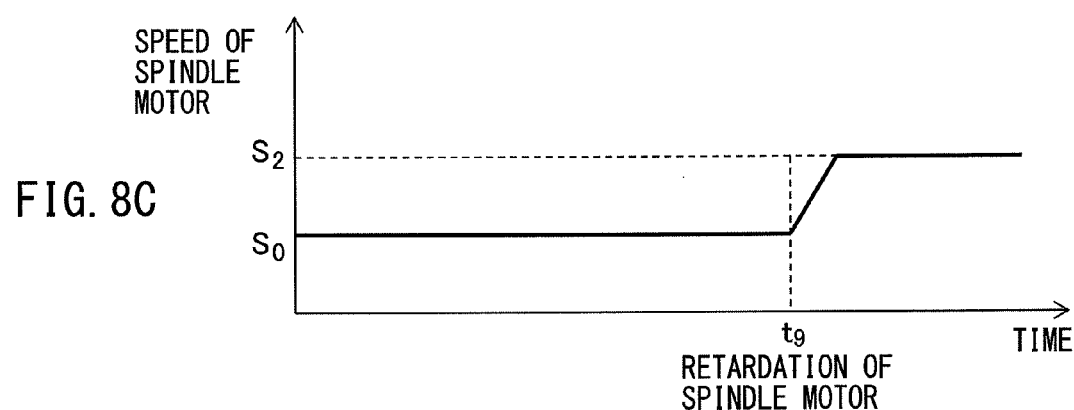
FIG. 8C is a graph for explaining the relationship between the speed of a spindle motor and the timings of a power failure detection and start of a protecting operation when the spindle motor is accelerated in a motor control apparatus according to an embodiment 2 of the present invention; and, FIG. 9 is a flow chart for explaining the operation sequence of a motor control apparatus according to an embodiment 2 of the present invention.

Next, description will be made on the operation of the motor control apparatus when the spindle motor is accelerated. FIGS. 8A to 8C are graphs showing time-dependent changes of the power supply voltage amplitude value in the three-phase AC power supply 10, the DC voltage value of the DC link 20 and the speed of the spindle motor, respectively when the spindle motor is accelerated. The time-dependent change of the power supply voltage amplitude value of the three-phase AC power supply 10 shown in FIG. 8A is the same as FIG. 7A.

As shown by the solid line in FIG. 8B, the DC voltage of the motor control apparatus according to the embodiment 2 behaves in the same manner as in the embodiment 1 until time $t_2$ at which a power failure is detected in the three-phase AC power supply 10. When a motor 30 other than the spindle motor 40 is decelerated in the interval from time $t_2$ to time $t_8$, the DC voltage value sharply increases. In the motor control apparatus according to the embodiment 2, however the spindle motor 40 is accelerated from a speed $S_0$ to $S_2$ at time $t_9$ (See FIG. 8C) before the DC voltage reaches a predetermined value $V_{DC4}$ as indicated by a fourth curved line. This promotes consumption of energy from the DC link 20 so that the DC voltage value of the DC link 20 lowers. As a result, the DC voltage value of the DC link 20 will not increase equal to or higher than the predetermined value $V_{DC4}$, hence it is possible to avoid abnormal voltage increase of the DC link 20. This value $V_{DC4}$ is determined depending on the withstand voltage of the parts and other factors.

As described above, according to the motor control apparatus of the embodiment 2, it is possible to control the DC link voltage by mutually exchanging energy between the kinetic energy of the motor and the energy in the DC link by acceleration and deceleration of the spindle motor. As a result, this scheme makes it possible to increase the possibility of keeping up the DC link voltage at the occurrence of a power failure and the possibility of avoiding the start of a machine protecting operation at momentary power failures.

Figure 9:
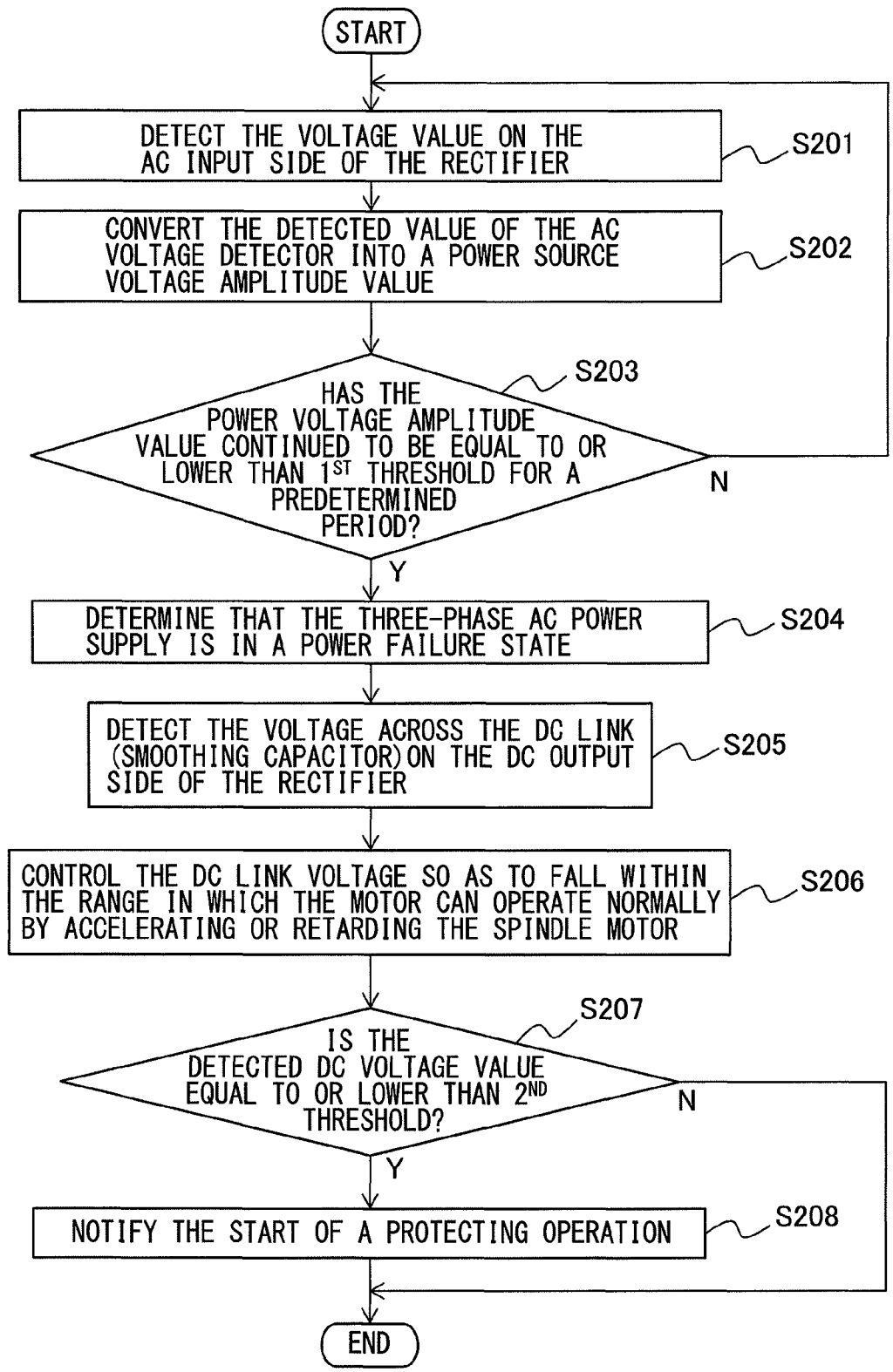

Next, the operation sequence of the motor control apparatus according to the embodiment 2 of the present invention will be described with reference to the flow chart shown in FIG. 9.

First, at Step S201 AC power is supplied from the three-phase AC power supply 10 to the rectifier 1, and the AC voltage detector 4 detects the value of voltage on the AC input side of the rectifier 1, as shown in FIG. 6. Next, at Step S202 the voltage amplitude calculator 5 converts the detected value of the AC voltage detector 4 into a power supply voltage amplitude value. This conversion may be done by converting the detected value by phase conversion from three phase to two phase and calculating the norm of the obtained vector, or may be performed by determining the peak value of the detected value.

Next, at Step S203 the power failure detector 6 determines whether or not the power supply voltage amplitude value calculated by the voltage amplitude calculator 5 has continued to be equal to or lower than the first threshold for a predetermined period of time. When it is determined that the power supply voltage amplitude value has not continued to be equal to or lower than the first threshold for the predetermined period of time, the control returns to Step S201 and detection of the voltage value of the three-phase AC power supply 10 is continued.

On the other hand, when the power supply voltage amplitude value has continued to be equal to or lower than the first threshold for the prescribed period of time, the three-phase AC power supply 10 is determined to be in a power failure state at Step S204.

Next, at Step S205 the DC voltage detector 7 detects the DC voltage value, or the voltage across the DC link 20 (smoothing capacitor 2) on the DC output side of the rectifier 1.

Next, at Step S206 the inverter 31 for spindle accelerates or decelerates the spindle motor 40 while monitoring the detected DC voltage value from the DC voltage detector 7 so as to perform control such that the DC link voltage falls within the range in which the motor 30 can continue normal operation as far as possible. Then, at Step S207 the protecting operation start determining unit 8 determines whether or not the detected DC voltage value is equal to or lower than the second threshold. When the detected DC voltage takes a value equal to or lower than the second threshold, the protecting operation start determining unit 8 notifies the inverter 3 of the start of a protecting operation at Step S208.

On the other hand, when the detected DC voltage takes a value greater than the second threshold, the protecting operation start determining unit 8 will not notify the inverter 3 of the start of a protecting operation. In this way, the protecting operation start determining unit 8 is adapted to give a notice of start of a protecting operation when the power failure detector determines the occurrence of a power failure and when the detected DC voltage takes a value equal to or lower than the second threshold.

As described above, according to the motor control apparatus of the embodiment 2, notification of the occurrence of a power failure to the inverter 31 for spindle increases the possibility of keeping up the DC link voltage as is at the occurrence of a power failure, it is hence possible to continue normal operation without performing a protecting operation at momentary power failures, more reliably than the motor control apparatus according to the embodiment 1.

The motor control apparatus of the embodiment of the present invention makes it possible for the machine to operate without degrading work efficiency even in a case where a power failure occurs, by implementing a machine protecting operation only when it is actually needed.

What is claimed is:
1. A motor control apparatus comprising:
a rectifier configured to convert AC power supplied from a three-phase AC power supply into DC power;
a smoothing capacitor provided for a DC link on the DC output side of the rectifier;
an inverter that is connected to the DC link and mutually converts power between DC power at the DC link, and the drive power of a motor for driving a axis or AC power as the regenerative power from the motor;
an AC voltage detector configured to detect the AC voltage value of the three-phase AC power supply;
a voltage amplitude calculator configured to convert the AC voltage value into a power supply voltage amplitude value;
a power failure detector configured to detect a state of power failure of the three-phase AC power supply when the power supply voltage amplitude value has continued to be equal to or lower than a first threshold for a predetermined period of time;
a DC voltage detector configured to detect the DC voltage value of the smoothing capacitor; and,
a protecting operation start determining unit configured to notify the inverter of the actuation of axis stoppage or axis retraction when the power failure detector has detected a power failure of the three-phase AC power supply and when the DC voltage value is equal to or lower than a second threshold,
wherein when the three-phase AC power supply is restored after a time at which the power failure occurs and before a time at which a motor protecting operation is started, the motor protecting operation is avoided, and
wherein the second threshold is set at a value greater than the sum of the DC voltage value of the DC link under which the motor cannot continue to run normally and the energy required from detection of a power failure to the start of a machine protecting operation, as a margin.

2. The motor control apparatus according to claim 1, wherein a plurality of inverters are connected to the DC link, and at least one of the multiple inverters accelerates or decelerates the motor when the power failure detector detects the power failure of the three-phase AC power supply, whereby the DC voltage is controlled to fall within a predetermined range above the second threshold.

* * * * *